Aug. 8, 1939  J. W. DAWSON  2,169,023
POWER CONTROL SYSTEM
Filed Jan. 31, 1935  3 Sheets-Sheet 2

WITNESSES:
C. J. Weller.
R R Lockwood

INVENTOR
John W. Dawson.
BY J. M. Crawford
ATTORNEY

Aug. 8, 1939.  J. W. DAWSON  2,169,023
POWER CONTROL SYSTEM
Filed Jan. 31, 1935  3 Sheets-Sheet 3

WITNESSES:  INVENTOR
C. J. Weller.  John W. Dawson.
R. R. Lockwood  ATTORNEY

Patented Aug. 8, 1939

2,169,023

UNITED STATES PATENT OFFICE

2,169,023

POWER CONTROL SYSTEM

John W. Dawson, Wilkinsburg, Pa., assignor to Westinghouse Electric & Manufacturing Company, East Pittsburgh, Pa., a corporation of Pennsylvania Application January 31, 1935, Serial No. 4,321

27 Claims. (Cl. 250—27)

My invention relates generally to electrical control systems and it has particular relation to the control of the functioning of electronic devices for controlling the flow of current to a load device.

The object of my invention, generally stated, is to provide a system for controlling the functioning of electronic devices arranged to conduct load current in a manner which shall be simple and efficient in operation and which may be readily and economically employed.

An important object of my invention is to provide for rendering an electronic device conducting for a number of half cycles depending upon the discharge rate of a capacitor.

Another important object of my invention is to provide for sequentially rendering conducting a second and oppositely connected electronic device by the application thereto of a de-phased voltage appearing as a result of the first device becoming conducting.

A concrete object of my invention is to provide a grid biasing voltage by discharging a capacitor for rendering an electronic device conducting for a number of half cycles, depending upon the discharge rate of the capacitor, and also a grid biasing voltage for a second oppositely connected electronic device from a de-phased voltage appearing as a result of the first device becoming conducting for rendering the second device conducting during the same number of successive half cycles as the first device.

Another object of my invention is to provide for controlling a variable impedance device by successively rendering conducting a pair of oppositely connected electronic devices, one of them being rendered conducting for a number of half cycles, depending upon the discharge rate of a capacitor, and the other being rendered conducting in response to the first becoming conducting.

A further object of my invention is to provide for employing a rectifier to apply a succession of negative half cycles forming a peaked wave form of grid biasing voltage to render a space discharge device conducting at a predetermined time.

Still another object of my invention is to provide for conditioning a pair of oppositely connected electronic devices to become conducting at a predetermined instant in any half cycle and rendering them conducting during a predetermined number of cycles, one of them being rendered conducting for a number of half cycles, depending upon the discharge rate of a capacitor, and the other being rendered conducting in response to the first becoming conducting.

Other objects of my invention will, in part, be obvious, and, in part, appear hereinafter.

My invention, accordingly, is disclosed in the embodiment hereof shown in the accompanying drawings and comprises the features of construction, combination of elements, and arrangement of parts, which will be exemplified in the construction hereinafter set forth, and the scope of the application of which will be indicated in the appended claims.

For a more complete understanding of the nature and scope of my invention, reference may be had to the following detailed description, taken in connection with the accompanying drawings, in which.

Figure 1:
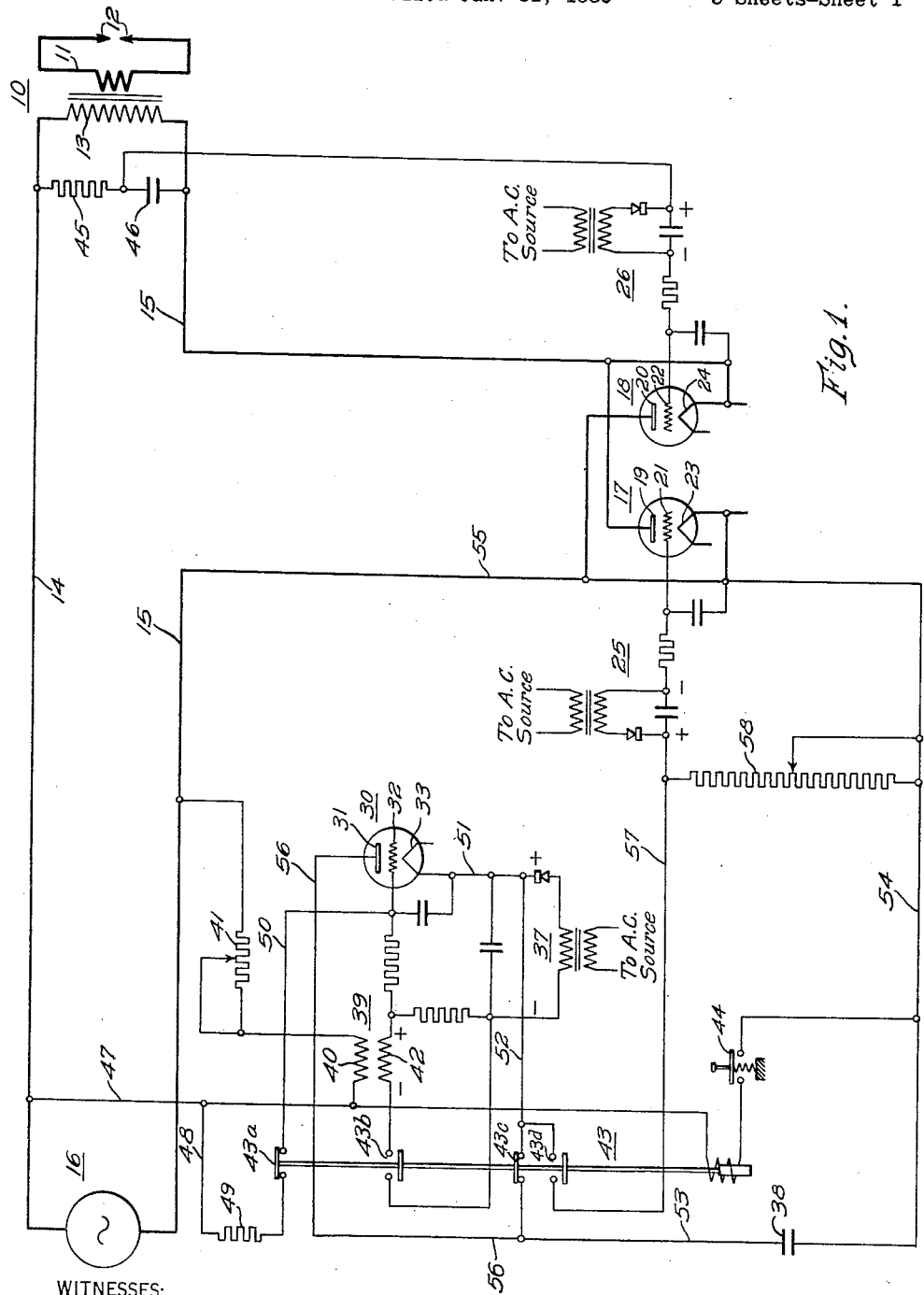
Figure 1 illustrates diagrammatically a concrete embodiment of my invention.

According to my invention, I provide a pair of oppositely connected electronic or space discharge devices or valves for controlling the flow of current from an alternating-current source to a load device. It is a well known characteristic of an electronic device that it is adapted to permit the flow of current therethrough in one direction only, or, in other words, to conduct either positive or negative half cycles of alternating current. Thus if a pair of oppositely connected electronic devices is interposed between an alternating-current source and a load device, and the devices are successively rendered conducting during succeeding half cycles, a full-wave of alternating current will be conducted.

A particular application of such an arrangement is found in spot or resistance welding. For this application, it is desirable to very accurately measure out the power which is provided for performing a welding operation, so that proper welding conditions may be repeatedly duplicated after the optimum conditions have been determined.

The load device may then comprise a welding transformer having a secondary winding connected to the welding electrodes and a primary winding disposed to be connected to a source of alternating current through a pair of oppositely connected electronic devices. By controlling the time in each half cycle and the number of half cycles during which the electronic devices are rendered conducting, it is possible to very accurately measure out the power that is permitted to flow to the welding transformer.

In order to simplify the control for the electronic devices, one of them is rendered conducting for a number of half cycles depending upon the discharge rate of a capacitor. The capacitor is arranged to be connected through a space discharge device to discharge through a resistor. The resulting voltage appearing across the resistor is applied to the control electrode of one of the electronic devices for rendering it conducting. The capacitor is recharged by utilizing the grid rectifying characteristic of the space discharge device. The time in the half cycle at which the electronic device is rendered conducting is determined by means of a phase shifting circuit which controls the instant at which the control space discharge device becomes conducting to permit the capacitor to discharge therethrough.

The other electronic device is rendered conducting due to the flow of current through the first electronic device. In order to obtain maximum ionizing voltage for the control electrode of the second electronic device, a phase shifting circuit is provided which is disposed to be energized on flow of current through the first electronic device. The de-phased voltage thus obtained is applied to the control electrode of the second electronic device, and it is thereby rendered conducting during the next succeeding half cycle and only during this time after the first electronic device has been rendered conducting.

In using the description "dephasing circuit" I mean one which has input terminals and output terminals, the voltage of the latter being dephased from that across said input terminals.

In a modification of my invention, I have illustrated its application to the control of a variable impedance device, which is interposed between the load and the alternating-current source. The pair of oppositely connected electronic devices is connected across the terminals of the secondary winding of the variable impedance device. When they are rendered conducting during successive half cycles, the impedance of the device is reduced to a negligible value and current flows to the load device.

In the second modification of my invention, the control space discharge device is rendered conducting by applying a succession of negative half waves to its control electrode. The time at which the control space discharge device is rendered conducting in a half cycle is determined by an adjustable phase shifting circuit which is arranged to alter the phase relation of the rectified negative half waves with respect to the voltage of the alternating-current source.

In a further application of my invention, I have provided a pair of oppositely connected vapor-electric devices of the mercury-vapor type which are known as Ignitrons. Each of the vapor-electric devices is rendered conducting by the occurrence of a combination of conditions. The instant in any half cycle at which the vapor-electric devices are rendered conducting is controlled by means of an adjustable phase-shifting circuit. By this means it is possible to control the power that is supplied to the load, so that, for example, different welding heats may be obtained without the necessity of adjusting taps or otherwise regulating the voltage applied to the load from the alternating-current source. The number of half-cycles during which the vapor-electric devices are rendered conducting may be determined by the oppositely connected space discharge devices operating in conjunction with the phase shift control system. One of these devices may be rendered conducting for a number of half cycles depending upon the discharge rate of a capacitor while the other may be rendered conducting during successive half cycles in response to the preceding half cycle having been conducted.

Referring now particularly to Fig. 1 of the drawings, the reference character 10 designates generally a transformer having a secondary winding 11 which may be connected to a load, such as a welding circuit, and represented by the electrodes 12. The transformer 10 is provided with a primary winding 13 which may be connected by conductors 14 and 15 to a source of alternating-current 16. Interposed between the transformer 10 and the alternating-current source 16 in the conductor 15 is a pair of oppositely connected space or electric discharge devices 17 and 18. The devices 17 and 18 are respectively provided with anodes 19, 20, control grids 21, 22, and cathodes 23, 24.

Normally, a negative bias voltage is applied to the grids 21 and 22 by means of direct-current sources 25 and 26. As illustrated, the direct-current sources 25 and 26 each comprise a transformer which is connected through a half-wave rectifier, which may be of the dry type, to a capacitor, the transformer being connected to a suitable source of alternating current. It will be understood, however, that this type of negative grid voltage is shown for illustrative purposes and that any other suitable source, such as a battery or the like, may be used for providing the indicated polarities to apply negative biasing voltage to the grids 21 and 22.

With a view to controlling the functioning of the electric discharge device 17, a control space discharge device, shown generally at 30, is provided. As illustrated, the device 30 is provided with an anode 31, a control grid 32 and a cathode 33. Normally, a negative biasing voltage is applied to the grid 32 from a direct-current source 37 similar to the sources 25 and 26. The control space discharge device 30 is arranged to permit the discharge of a capacitor 38, which determines the number of half cycles during which the electric discharge device 17 is to be conducting.

The instant at which the control space discharge device 30 is rendered conducting is controlled by means of an impulse transformer 39 having a primary winding 40 connected through a potentiometer 41 to the alternating-current source 16. The secondary winding 42 of the impulse transformer 39 is arranged to be connected in the control circuit to the grid 32 for overcoming the normally applied negative biasing voltage by the application of a positive biasing voltage. It will be understood that the combination of the potentiometer 41 and the primary winding 40 forms a phase shifting circuit so that the phase relationship of the voltage appearing in the secondary winding 42 may be altered with respect to the voltage of the alternating-current source 16 by adjusting the potentiometer 41. An impulse transformer is provided, rather than a transformer of standard construction, in order to apply a peaked wave form of positive biasing voltage to the grid 32 in order to insure that the control space discharge device 30 will be rendered conducting at a particular predetermined instant.

In order to connect the secondary winding 42 of the impulse transformer 39 to render the control space discharge device 30 conducting and also for certain other purposes which will appear hereinafter, a control switch 43 is provided having normally closed and open contact members, as indicated. The operation of the control switch 43 may be controlled by means of a push button switch 44 that may be depressed by the operator when it is desired that current be permitted to flow to the load device.

For the purpose of rendering the second electric discharge device 18 conducting, a phase shift circuit comprising a resistor 45 and a capacitor 46 is connected to be responsive to the current flow through the first electric discharge device 17. As illustrated, this phase shift circuit may be connected across the terminals of the primary winding 13 of the transformer 10. Thus when the first electric discharge device 17 is rendered conducting, the half cycle of current flowing through the primary winding 13 will cause a voltage to appear across the resistor 45 and the capacitor 46. The voltage thus obtained is applied, as illustrated, to the grid 22, so that the electric discharge device 18 is rendered conducting during a succeeding half cycle after the electric discharge device 17 has been rendered conducting. It will be understood that the electric discharge device 18 is rendered conducting only after the electric discharge device 17 is rendered conducting. Since this sequence always occurs, there is no possibility that a direct-current component will appear in the circuit connected to the primary winding 13 due to the saturating characteristics of the transformer 10, which would otherwise be the case if an odd number of half cycles were applied.

When the power factor of the load is relatively high, I have found that the maximum biasing voltage is applied to the grid 22 when the resistor 45 and capacitor 46 are connected, as illustrated. When the power factor of the load is comparatively low, it is desirable to reverse the connections of the resistor 45 and the capacitor 46 to those illustrated in Figs. 2 and 3 of the drawings, in order that maximum biasing voltage may be applied to the grid 22 under this operating condition. It may be shown mathematically that such a relationship exists, but since this mathematical derivation is complicated and will not serve to further set forth the invention, it is omitted.

In operation, the capacitor 38 is charged by utilizing the grid rectifying characteristic of the control space discharge device 30. The charging circuit for the capacitor 38 may be traced from the conductor 14 through conductors 47, 48, resistor 49, contact members 43a, conductor 50, grid 32, cathode 33, conductors 51, 52, contact members 43c, conductor 53, capacitor 38, and conductors 54, 55 to conductor 15. Ordinarily, the time during which current is not being supplied to the transformer 10 is sufficiently long to permit the capacitor 38 to be fully charged.

The operator now depresses the push button switch 44 thereby energizing the operating winding of the control switch 43. The charging circuit to the capacitor 38 is then opened at contact members 43a and 43c. The capacitor 38 is then allowed to discharge through the control space discharge device 30 as soon as it is rendered conducting by the biasing voltage being impressed on the grid 32 on closure of the contact members 43b and the occurrence of the peaked wave form of voltage in the secondary winding 42 sufficient to overcome the negative voltage applied to the grid 32 by means of the source 37.

The discharge circuit for the capacitor 38 may be traced from the capacitor 38 through conductors 53, 56, anode 31, cathode 33, conductors 51, 52, contact members 43d, conductor 57, potentiometer 58 and conductor 54 to the capacitor 38.

The voltage appearing across the potentiometer 58 is sufficient to overcome the negative biasing voltage applied to the grid 21, and as a result, the electric discharge device 17 becomes conducting during the next half cycle for which it is adapted to be conducting. The time in this half cycle at which it becomes conducting is determined by the instant of time at which the proper biasing voltage is applied to the grid 21. This, in turn, it will be understood, is controlled by the instant of time at which the control space discharge device 30 is rendered conducting.

In response to the electric space discharge device 17 being rendered conducting, a half cycle of alternating current or a portion thereof is permitted to flow through the primary winding 13 of the transformer 10. The voltage then appearing across the phase shift circuit comprising the resistor 45 and the capacitor 46 is such that the resulting biasing voltage applied to the grid 22 renders the second electric discharge device 18 conducting.

The electric discharge device 17 will be rendered conducting for a time depending upon the discharge rate of the capacitor 38. As long as the voltage appearing across the potentiometer 58 is sufficiently high as to overcome the normal negative biasing voltage provided by the source 25, the electric discharge device 17 will be rendered conducting during successive half cycles of the same polarity. The discharge rate of the capacitor 38 depends upon the voltage to which it is charged and the resistance of the discharge circuit. By regulating either of these variables, the number of half cycles during which the electric discharge device 17 is rendered conducting may be varied. Therefore, for adjusting the number of half cycles conducted, the potentiometer 58 may be regulated to obtain the desired adjustment. It will be understood, however, that this same adjustment may be obtained by regulating the voltage to which the capacitor 38 will be charged.

In ordinary operation, it is desirable to adjust the potentiometer 41 to render the control space discharge device 30 conducting at the time when the initial zero point of the half cycle normally occurs during which the electric discharge device 17 is adapted to be conducting. Since the second electric discharge device 18 will be rendered conducting at the beginning of the next successive half cycle, this adjustment is desirable.

Figure 2:
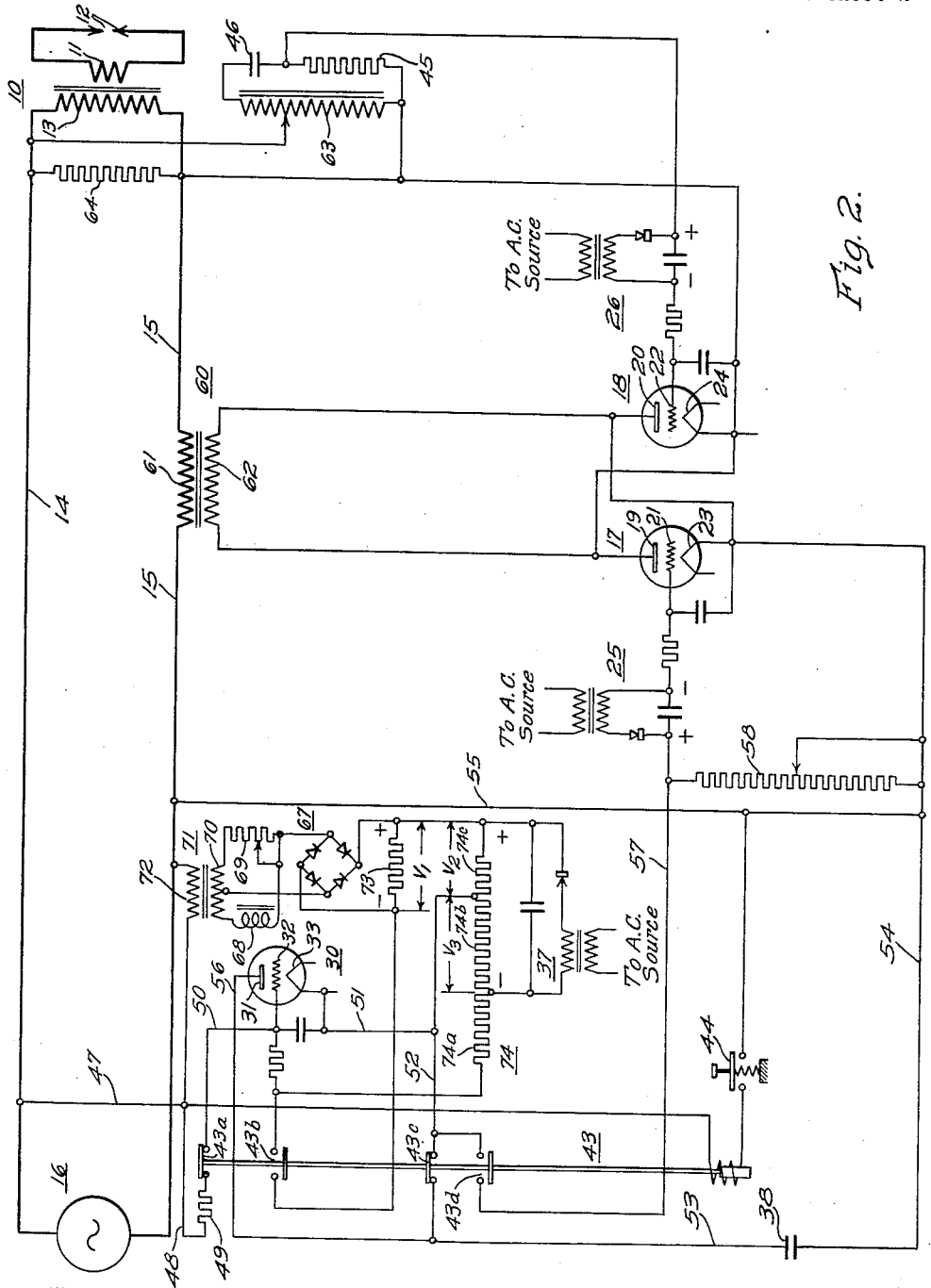
Fig. 2 illustrates a modification of my invention incorporating certain novel features of grid control not illustrated in Fig. 1.

Referring now particularly to Fig. 2 of the drawings, it will be observed that a variable impedance device 60 is provided for controlling the flow of current from the alternating-current source 16 to the transformer 10. The device 60 comprises a primary winding 61 connected in the conductor 15, as illustrated, and a secondary winding 62, each terminal of which may be connected to an anode and a cathode of the electric discharge devices 17 and 18, as illustrated. It will be understood that when the electric discharge devices 17 and 18 are successively rendered conducting, the impedance of the device 60 is reduced to a negligible value with the result that maximum current is permitted to flow to the transformer 10.

In this modification of the invention, the phase shifting circuit comprising the resistor 45 and the capacitor 46 may be connected across the terminals of an adjustable auto-transformer 63, which may be connected across the primary winding 13 of the transformer 10. As set forth hereinbefore, the connections of the resistor 45 and the capacitor 46 are reversed from those shown in Fig. 1 on the assumption that the system is to operate at a low power factor.

In order to limit the voltage applied to the auto-transformer 63, when the secondary winding 62 of the variable impedance device 60 is open circuited and the load circuit represented by the electrodes 12 is open, a resistor 64 is provided.

It will be observed that the grid circuit for the control space discharge device 30 is different in Fig. 2 from that illustrated in Fig. 1. With a view to obtaining the peaked biasing voltage, a full-wave rectifier 67 of the dry type may be provided which may be energized from alternating current obtained from an adjustable phase shifting circuit comprising an inductor 68 and a potentiometer 69. As illustrated, the rectifier 67 is connected between the common connection of the inductor 68 and potentiometer 69 and the midpoint of a secondary winding 70 of a transformer 71, the primary winding 72 of which may be connected for energization across the alternating-current source 16. The output of the rectifier 67 may be applied to the resistor 73.

It will be understood that the biasing voltage appearing across the resistor 73 will be a succession of half cycles of the same polarity and will be termed negative half cycles, since a voltage of such polarity is desired. This voltage may be indicated by the reference character $V_1$.

The normal negative biasing voltage provided by the source 37 may be applied to a resistor 74 having sections 74a, 74b, 74c, as illustrated. The resistance of section 74a is considerably greater than that of the remaining sections and resistor 73.

In operation, when current is not being supplied to the transformer 10, the capacitor 38 will be charged over the same circuit that has been traced hereinbefore, in which the grid rectifying characteristic of the control space discharge device 30 is utilized. During this time, it will be apparent that a negative bias voltage obtained by the voltage drop across section 74b of the resistor 74 and represented by the reference character $V_3$ is applied to the grid 32.

When it is desired to permit the flow of current to the transformer 10, the operator depresses the push button 44, thereby operating the control switch 43. The charging circuit to the capacitor 38 is then opened.

At contact members 43b a circuit is completed for connecting the grid 32 to a biasing voltage represented by the succession of negative half cycles $V_1$ and a positive biasing voltage represented by the voltage drop across the section 74c of the resistor 74, which may be represented by the reference character $V_2$. Since the voltage $V_2$ is positive, it shifts the axis of the series of successive negative half cycles of the voltage $V_1$ above the critical voltage of the control space discharge device 30 with the result that the peaks occurring at the end and beginning of the successive negative half cycles are sufficient to cause the control space discharge device 30 to become conducting. The first of these peaks, causing the control space discharge device 30 to become conducting, is all that is necessary, since it characteristically remains conducting after once having been placed in this state as long as sufficient voltage of proper polarity is applied to the anode 31 to maintain the flow of current.

It will be understood that the time at which the peaked wave form of voltage occurs to render the control space discharge device 30 conducting may be altered by adjusting the potentiometer 69. It will then be possible to adjust the instant in the half cycle at which the electric discharge device 17 is adapted to become conducting.

Figure 3:
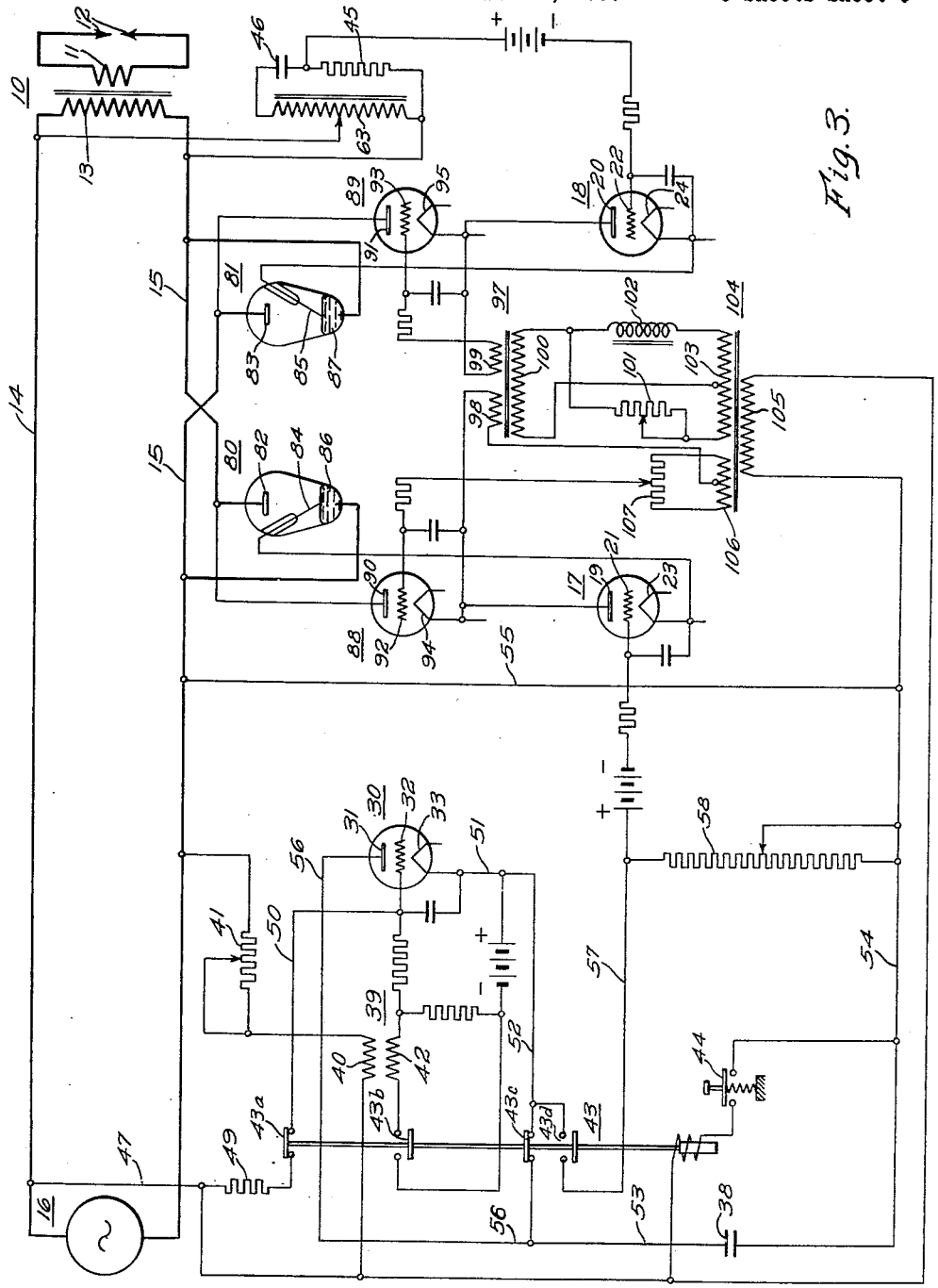
Fig. 3 illustrates diagrammatically a further application of my invention applied in combination with certain other equipment.

Referring now particularly to Fig. 3 of the drawings, it will be observed that a pair of vapor-electric devices 80 and 81 is provided. These devices are oppositely connected in the conductor 15 so that successive half waves of the alternating current may be conducted therethrough. Each of the vapor-electric devices 80 and 81 comprises respectively anodes 82, 83, control electrodes 84, 85 and mercury pool cathodes 86, 87. When current is caused to flow through either of the control electrodes 84 or 85 into the mercury pool cathode 86 or 87, a cathode spot is formed, at which instant the device is rendered conducting provided that the proper polarity is applied to the anode 82 or 83 for which the devices are adapted to be conducting.

In this modification of the invention, the devices 80 and 81 are controlled in part by a phase shifting control system. This system comprises space discharge devices 88 and 89, each of which is respectively provided with anodes 90, 91, control electrodes 92, 93 and cathodes 94, 95. A grid transformer 97 is provided having a secondary winding 98 connected to the grid 92 and a secondary winding 99 connected to the grid 93. The primary winding 100 of the grid transformer 97 is connected across a phase shifting circuit comprising a potentiometer 101 and an inductor 102. The phase shifting circuit may be energized, as illustrated, from the secondary winding 103 of a transformer 104, the primary winding 105 of which may be connected for energization to the alternating-current source 16.

An auxiliary secondary winding 106 is provided for energizing a potentiometer 107 which is connected in series circuit relation with the grid 92. This circuit is provided for balancing the conducting characteristics of the vapor-electric devices 80 and 81, since they may not be exact duplicates and it may be desirable to render one of them conducting slightly ahead of or behind the other relatively in its corresponding half cycle in order to insure that there will be no direct-current component flowing in the circuit to the primary winding 13 of the transformer 10.

It will be observed that the grid biasing voltage for the grids 21, 22 and 32 is obtained by means of batteries rather than the sources indicated in Figs. 1 and 2. This alteration has been merely for the purpose of convenience and showing that a different source may be employed. The auto-transformer 63 may be provided for energizing the phase shifting circuit comprising the resistor 45 and the capacitor 46 in order to apply the proper biasing voltage to the grid 22 as set forth hereinbefore.

The remaining circuits for controlling the functioning of the system are substantially identical with those shown in Fig. 1 of the drawings.

In operation, the capacitor 38 will be charged by utilizing the grid rectifying characteristic of the control space discharge device 30. The potentiometer 107 is adjusted to compensate for any differences in the vapor-electric devices 80 and 81. The potentiometer 101 is adjusted to render the vapor-electric devices 80 and 81 conducting at a predetermined instant in succeeding half cycles. By this means, it is possible to vary the power supplied to the transformer 10 with the result that, in this instance, the welding heat provided at the welding electrodes 12 may be altered without necessitating the use of taps on the primary winding 13 or other means for varying the applied voltage.

The operator depresses the push button 44 and operates the control switch 43. The control space discharge device 30 is then rendered conducting at a time depending upon the adjustment of the potentiometer 41. Ordinarily, this adjustment will be such as to cause the electric discharge device 17 to become conducting at the initial zero point in its half cycle of the alternating current. The time in each half cycle at which the vapor-electric devices 80 and 81 are rendered conducting is then determined solely by the phase shifting control discharge devices 88 and 89 becoming conducting.

As soon as the vapor-electric discharge device 80 is rendered conducting, the voltage appearing across the primary winding 13 is applied to the auto-transformer 63. The proper biasing voltage is then applied to the grid 22 to render the vapor-electric device 81 conducting during the next succeeding half cycle at a time determined by the instant at which the phase shifting electric discharge device 89 is rendered conducting.

As has been set forth hereinbefore, the number of half cycles that will be conducted will be determined by the discharge rate of the capacitor 38. This may be altered by adjusting the potentiometer 58, as will be understood. It is then possible with this system to vary not only the number of half cycles which are conducted but also to vary the portion of each half cycle which will be conducted.

Since further changes may be made in the foregoing construction and different embodiments of the invention may be made without departing from the scope thereof, it is intended that all matter shown in the accompanying drawings or set forth in the foregoing description shall be interpreted as illustrative and not in a limiting sense.

I claim as my invention:

1. An electric control system including a load device disposed to be connected to a source of alternating current and comprising, in combination, main space discharge means interposed between the load device and the current source for conducting current in half cycle increments, auxiliary space discharge means, a capacitor, means for utilizing the rectifying characteristic of said auxiliary space discharge means for charging said capacitor, and means for discharging said capacitor through said auxiliary space discharge means for rendering said main discharge means conducting for a number of half cycles depending upon the rate of discharge of said capacitor.

2. In an electric control system including a load device disposed to be connected to an alternating-current source, in combination, a pair of oppositely connected electric valves disposed to conduct successive half cycles of the alternating current to the load device, reactance means connected to determine a plural number of half cycles to be conducted by one of said valves, and means for rendering the other valve conducting as a result of said one valve being rendered conducting.

3. In an electric control system including a load device disposed to be connected to an alternating-current source, in combination, a pair of oppositely connected electric valves disposed to conduct successive half cycles of the alternating current to the load device, reactance means connected to render one of said valves conducting for a plural number of half cycles depending upon the discharge rate of said reactance means, and means for successively rendering the other valve conducting as a result of said one valve being rendered conducting.

4. In an electric control system including a load device disposed to be connected to an alternating-current source, in combination, a pair of oppositely connected electric valves interposed between the load device and the current source and disposed to permit the flow of successive half cycles of the alternating current, capacitance means connected to condition one of said valves to conduct a predetermined plural number of half cycles, means for successively rendering the other valve conducting as a result of said one valve becoming conducting, and means for initially rendering said one valve conducting at a predetermined instant in the first half cycle of current conducted.

5. An electric control system including a load device disposed to be connected to an alternating-current source and comprising, in combination, a pair of oppositely connected space discharge devices interposed between the load device and the current source for conducting successive half cycles of the alternating current, a control space discharge device, a capacitor, switch means disposed in one position to effect the utilization of the rectifying characteristic of said control space discharge device for charging said capacitor and in another position for connecting said capacitor to discharge through said control space discharge device to render one of said pair of space discharge devices conducting for a number of half cycles depending upon the discharge rate of said capacitor, and means for successively rendering the other space discharge device of said pair conducting as a result of said one space discharge device becoming conducting.

6. In a power system, in combination, a transformer having a primary winding disposed to be connected to an alternating-current source and a secondary winding for connection to a load circuit, a pair of oppositely connected space discharge devices interposed between said primary winding and said current source for conducting successive half cycles of the alternating current, means for rendering one of said space discharge devices conducting, and means including a dephasing circuit having input terminals connected across the terminals of said primary winding and having output terminals which, on flow of current through said one space discharge device impress a dephased voltage on the other space discharge device for rendering it conducting.

7. A power system comprising, in combination, a load device disposed to be connected in circuit with an alternating-current source, a transformer having a primary winding interposed between said load device and said current source and a secondary winding, a pair of space discharge devices connected to said secondary winding and disposed to short circuit it on being rendered conducting during successive half cycles of the alternating current for increasing the flow of current to said load device, means for rendering one of said space discharge devices conducting, and means for rendering the other space discharge device conducting as a result of said one space discharge device being rendered conducting.

8. An electric translation system comprising, in combination, a current source, a load device, an electric valve interposed between said current source and said load device for conducting current thereto, said valve being provided with an anode, a cathode and a grid for controlling the current conducted, a circuit connecting said grid and said cathode including a negative bias voltage for normally rendering said valve non-conducting, and a second circuit disposed to connect said grid and said cathode including a positive bias voltage and a source of consecutive negative half cycles derived from an alternating-current source for rendering said valve conducting at a predetermined instant.

9. An electric control system including a load device disposed to be connected to a source of alternating current and comprising, in combination, main space discharge means interposed between the load device and the alternating-current source for conducting current in half cycle increments, a current source, an auxiliary space discharge device interposed between said main space discharge means and said last-named current source for rendering said main space discharge means conducting when said auxiliary space discharge device is rendered conducting, said device including an anode, a cathode and a grid for controlling the current conducted, and a circuit connecting said grid and said cathode including a positive bias voltage and a source of consecutive negative half cycles derived from said alternating-current source for rendering said device conducting at a predetermined instant and thereby rendering said main space discharge means conducting at the same instant.

10. An electric control system including a load device disposed to be connected to a source of alternating current and comprising, in combination, main space discharge means interposed between the load device and the alternating-current source for conducting current in half cycle increments, a current source, an auxiliary space discharge device interposed between said main space discharge means and said last-named current source for rendering said main space discharge means conducting when said auxiliary space discharge device is rendered conducting, said device including an anode, a cathode and a grid for controlling the current conducted, a circuit connecting said grid and said cathode including a negative bias voltage for normally rendering said device non-conducting, and a second circuit disposed to connect said grid and said cathode including a positive bias voltage and a source of consecutive negative half cycles derived from said alternating-current source for rendering said device conducting at a predetermined instant and thereby rendering said main space discharge means conducting at the same instant.

11. In an electric control system including a load device disposed to be traversed by alternating current from a source of alternating current, electric valve means disposed to conduct alternating current to the load device in successive half cycle increments, and reactance means connected to control the flow of a predetermined number of successive half cycles of the alternating current to said load device.

12. In an electric control system including a load device disposed to be connected to a source of alternating current, electric valve means disposed to conduct alternating current to the load device in successive half cycle increments, and capacitance means connected to render said valve means conducting for a number of successive half cycles of the alternating current depending upon the rate at which said capacitance means is discharged.

13. In an electric control system including a load device disposed to be connected to a source of alternating current, electric valve means disposed to conduct alternating current to the load device in successive half cycle increments, capacitance means connected to render said valve means conducting for an interval depending upon the discharge rate of said capacitance means, and means for automatically recharging said capacitance means.

14. In combination, a source of potential, a capacitor, a discharge device having a control electrode and a plurality of principal electrodes, a charging circuit for said capacitor including said source and the discharge path between said control electrode and one of said principal electrodes and a discharging circuit for said capacitor including the discharge path between said principal electrodes.

15. In combination, a source of potential, a capacitor, a discharge device having a control electrode and a plurality of principal electrodes, a charging circuit for said capacitor including said source and the discharge path between said control electrode and one of said principal electrodes, a discharging circuit for said capacitor including the discharge path between said principal electrodes, and means cooperating with said control electrode functioning to control said discharging circuit.

16. In combination, a source of periodic potential, a capacitor, a discharge device having a control electrode and a plurality of principal electrodes, a charging circuit for said capacitor including said source and the discharge path between said control electrode and one of said principal electrodes, a discharging circuit for said capacitor including the discharge path between said principal electrodes, and means cooperating with said control electrode functioning to control the starting instant of said discharge with respect to a period of said source.

17. Apparatus according to claim 16, characterized by the fact that the cooperating means operates to impress a potential on the control electrode which is of short duration compared to a period of the source.

18. In a power system, in combination, reactive means disposed to be connected to an alternating-current source, a pair of oppositely connected space discharge devices interposed between said reactive means and said current source for conducting successive half cycles of the alternating current, means for rendering one of said space discharge devices conducting, and means including a dephasing circuit connected to be directly responsive to the voltage appearing across the terminals of said reactive means on flow of current through said one space discharge device for rendering the other space discharge device conducting.

19. In a power system, in combination, reactive means disposed to be connected to an alternating-current source, a pair of oppositely connected space discharge devices interposed between said reactive means and said current source for conducting successive half cycles of the alternating current, means for rendering one of said space discharge devices conducting, and means including a dephasing circuit connected to be responsive to the voltage appearing across the terminals of said reactive means on flow of current through said one space discharge device for rendering the other space discharge device conducting, said dephasing circuit comprising a capacitor and a resistor connected in series across the reactive means.

20. An electric translation system comprising, in combination, a current source, a load device, an electric valve interposed between said current source and said load device for conducting current therebetween, said valve being provided with an anode, a cathode and a grid for controlling the current conducted, a source of negative half cycles of potential derived from an alternating-current source and means for rendering said valve conducting, said means in combination with said source of negative half cycles rendering said valve conducting at a predetermined instant.

21. An electric translation system comprising, in combination, a current source, a load device, an electric valve interposed between said current source and said load device for conducting current therebetween, said valve being provided with an anode, a cathode and a grid for controlling the current conducted, a source of consecutive half cycles of potential derived from an alternating-current source and connected to said grid with such a polarity as to tend to make its potential negative relative to said cathode, and means for impressing potential between said grid and said cathode tending to render said valve conducting, said means in combination with said source rendering said valve conducting at a predetermined instant with respect to a cycle of the alternating current.

22. An electric translation system comprising, in combination, a current source, a load device, an electric valve interposed between said current source and said load device for conducting current thereto, said valve being provided with an anode, a cathode and a grid for controlling the current conducted, a bias potential tending to make said grid positive relative to said cathode, a source of consecutive half cycles of potential derived from an alternating-current source and connected to said grid with such a polarity as to tend to make its potential negative relative to said cathode, and means for impressing said bias potential and said half-cycles of potential between said grid and said cathode to render said valve conducting at a predetermined instant.

23. In combination, an electric discharge device having a control electrode and a plurality of principal electrodes, said discharge device being of the type wherein a current is restrained from passing between said principal electrodes by impressing a potential on said control electrode relative to a predetermined one of said principal electrodes which is algebraically less than a predetermined value, and current is permitted to pass between said principal electrodes by increasing the algebraic value of said potential to at least said predetermined value so that the potential of said control electrode becomes algebraically more positive relative to said predetermined principal electrode, a source of alternating potential, a pair of terminals, means interposed between said source and said terminals for reversing the polarity of every other half cycle of said alternating potential so that a periodic potential of twice the frequency of said alternating potential is impressed between said terminals, said means making one of said terminals electrically positive and the other electrically negative and means for connecting the electrically positive terminal to said predetermined one of said principal electrodes and the electrically negative terminal to said control electrode.

24. In combination, an electric discharge device having a control electrode and a plurality of principal electrodes, said discharge device being of the type wherein a current is restrained from passing between said principal electrodes by impressing a potential on said control electrode relative to a predetermined one of said principal electrodes which is algebraically less than a predetermined value, and current is permitted to pass between said principal electrodes by increasing the algebraic value of said potential to at least said predetermined value so that the potential of said control electrode becomes algebraically more positive relative to said predetermined principal electrode, a source of alternating potential, means for impressing a potential from said source between said principal electrodes, a pair of terminals, means interposed between said source and said terminals for reversing the polarity of every other half cycle of said alternating potential so that a periodic potential of twice the frequency of said alternating potential is impressed between said terminals, said last-mentioned means making one of said terminals electrically positive and the other electrically negative and means for connecting the electrically positive terminal to said predetermined one of said principal electrodes and the electrically negative terminal to said control electrode.

25. In combination, an electric discharge device having a control electrode and a plurality of principal electrodes, said discharge device being of the type wherein a current is restrained from passing between said principal electrodes by impressing a potential on said control electrode relative to a predetermined one of said principal electrodes which is algebraically less than a predetermined value, and current is permitted to pass between said principal electrodes by increasing the algebraic value of said potential to at least said predetermined value so that the potential of said control electrode becomes algebraically more positive relative to said predetermined principal electrode, a source of alternating potential, a pair of terminals, means coupled to said source for deriving an alternating potential shifted in phase relative to the potential of said source, means interposed between said derived alternating potential and said terminals for reversing the polarity of every other half cycle of said derived alternating potential so that a periodic potential of twice the frequency of said alternating potential is impressed between said terminals, said last-mentioned means making one of said terminals electrically positive and the other electrically negative and means for connecting the electrically positive terminal to said predetermined one of said principal electrodes and the electrically negative terminal to said control electrode.

26. In a system for controlling the flow of current in a circuit connecting a load device to an alternating-current source, in combination, a pair of oppositely connected electronic devices interposed in the circuit and disposed to conduct successive half cycles of the alternating current, adjustable means separately cooperative with each of said devices for rendering said devices conducting at different predetermined instants in each succeeding half cycle, and means for sequentially rendering said devices conducting.

27. In a system for controlling the flow of current in a circuit connected to an alternating-current source, a pair of electrical discharge devices at least one of which is provided with a control electrode and a pair of principal electrodes connected to permit the flow of opposite half cycles of current from said source to said system, a condenser connected to impress a potential proportional to its charge upon the control electrode of the said discharge device having a control electrode, said condenser being connected to be charged by a current flowing through the other said discharge device.

JOHN W. DAWSON.